(12) United States Patent
Matsuoka

(10) Patent No.: US 11,770,511 B2
(45) Date of Patent: Sep. 26, 2023

(54) IMAGE PROCESSING APPARATUS, IMAGE CAPTURE APPARATUS, CONTROL METHOD, AND COMPUTER-READABLE STORAGE MEDIUM

(71) Applicant: CANON KABUSHIKI KAISHA, Tokyo (JP)

(72) Inventor: Narumi Matsuoka, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/684,531

(22) Filed: Mar. 2, 2022

(65) Prior Publication Data

US 2022/0286656 A1    Sep. 8, 2022

(30) Foreign Application Priority Data

Mar. 5, 2021    (JP) ................. 2021-035635

(51) Int. Cl.
*H04N 9/77* (2006.01)
*H04N 9/73* (2023.01)
*H04N 23/63* (2023.01)

(52) U.S. Cl.
CPC ................. *H04N 9/77* (2013.01); *H04N 9/73* (2013.01); *H04N 23/63* (2023.01)

(58) Field of Classification Search
CPC ....................................................... H04N 9/77
USPC ................................................... 348/207.99
See application file for complete search history.

(56) References Cited

U.S. PATENT DOCUMENTS

2017/0289508 A1 * 10/2017 Fujioka ................ H04N 9/3105
2017/0318208 A1    11/2017 Toyoda
2019/0052790 A1     2/2019 Kang et al.

FOREIGN PATENT DOCUMENTS

JP    2010-245924 A    10/2010
WO   2020/007165 A1    1/2020

OTHER PUBLICATIONS

The above patent documents were cited in a European Search Report dated Jul. 29, 2022, a copy of which is enclosed, that issued in the corresponding European Patent Application No. 22158207.5.

* cited by examiner

*Primary Examiner* — Joel W Fosselman
(74) *Attorney, Agent, or Firm* — Cowan, Liebowitz & Latman, P.C.

(57) ABSTRACT

An image processing apparatus for generating an image to display on a display configured so that a setting for maximum display luminance can be changed, obtains an image signal and the setting, generates the image to display by executing image processing including tone conversion on the obtained image signal, and sets a tone characteristic used in tone conversion based on the setting. The tone characteristic is for allocating a signal value of the image signal to a luminance range according to the setting, and shows a relationship in which a logarithmic value of the signal value of the image signal and an absolute luminance are roughly identical in at least a portion of the luminance range, independent of the setting.

14 Claims, 7 Drawing Sheets

IMAGE PROCESSING APPARATUS, IMAGE CAPTURE APPARATUS, CONTROL METHOD, AND COMPUTER-READABLE STORAGE MEDIUM

BACKGROUND OF THE INVENTION

Field of the Invention

The present invention relates to an image processing apparatus, an image capture apparatus, a control method, and a computer-readable storage medium and particularly relates to tone conversion technology relating to generating an image for display.

Description of the Related Art

A display device has set unique gamma characteristics (display characteristics) that determine at what display luminance the tone of the input image is output. Thus, to display an image on the display device with the desired tonal expression, the input image needs to be adjusted taking into account the display characteristics. In Japanese Patent Laid-Open No. 2010-245924, generating an input image with improved visibility using a tone characteristic including an adjusted inverse characteristic of a display characteristic of an electronic viewfinder of an image capture apparatus is described.

As described in Japanese Patent Laid-Open No. 2010-245924, to ensure visibility of the image displayed in the electronic viewfinder, a tone characteristic configured by multiplying the inverse characteristic of the display characteristic by a power according to the brightness of the captured scene (viewing environment) is used to generate an input image from the captured image. Specifically, in a case where the captured scene is bright, the multiplier is increased and a through-the-lens image with increased contrast is displayed, and in a case where the captured scene is dark, the multiplier is decreased and a through-the-lens image with decreased contrast is displayed.

However, changing the tone characteristic which multiplies a power overall according to the brightness of the captured scene as described in Japanese Patent Laid-Open No. 2010-245924 makes the user looking into the electronic viewfinder perceive different contrasts at the different brightnesses, giving the user a sense that something is off. This kind of perceptual discomfort may also come about due to dynamically changing the maximum display luminance of the display device according to the brightness of the surroundings or the maximum display luminance being discretionarily changed.

SUMMARY OF THE INVENTION

The present invention is made in consideration of the problems described above and provides an image processing apparatus, an image capture apparatus, a control method, and a computer-readable storage medium for generating an image for display that gives a viewer uniform visibility, for example, contrast perception.

The present invention in its first aspect provides an image processing apparatus for generating an image to display on a display unit configured so that a setting for maximum display luminance can be changed, comprising at least one processor and/or circuit configured to function as following units: a first obtaining unit configured to obtain an image signal; a second obtaining unit configured to obtain the setting for the maximum display luminance of the display unit; a generating unit configured to generate the image to display by executing image processing including tone conversion on the image signal obtained by the first obtaining unit; and a setting unit configured to set a tone characteristic used in tone conversion executed by the generating unit based on the setting for the maximum display luminance obtained by the second obtaining unit, wherein the tone characteristic is for allocating a signal value of the image signal to a luminance range according to the setting for the maximum display luminance; and the tone characteristic shows a relationship in which a logarithmic value of the signal value of the image signal and an absolute luminance are roughly identical in at least a portion of the luminance range, independent of the setting for the maximum display luminance.

The present invention in its second aspect provides an image capture apparatus, comprising: the image processing apparatus according to the first aspect; image capture unit configured to capture an image of a captured scene and outputting the image signal; the display unit; and at least one processor and/or circuit configured to function as a changing unit configured to change the setting for the maximum display luminance of the display unit.

The present invention in its third aspect provides a control method for an image processing apparatus for generating an image to display on a display unit configured so that a setting for maximum display luminance can be changed, comprising: obtaining an image signal; obtaining the setting for the maximum display luminance of the display unit; generating the image to display by executing image processing including tone conversion on the obtained image signal; and setting a tone characteristic used in tone conversion executed in the generating on the basis of the setting for the obtained maximum display luminance, wherein the tone characteristic is for allocating a signal value of the image signal to a luminance range according to the setting for the maximum display luminance; and the tone characteristic shows a relationship in which a logarithmic value of the signal value of the image signal and an absolute luminance are roughly identical in at least a portion of the luminance range, independent of the setting for the maximum display luminance.

The present invention in its fourth aspect provides a computer-readable storage medium storing a program for causing a computer to function as the units of the image processing apparatus according to the first aspect.

Further features of the present invention will become apparent from the following description of exemplary embodiments (with reference to the attached drawings).

DESCRIPTION OF THE EMBODIMENTS

First Embodiment

Figure 1:
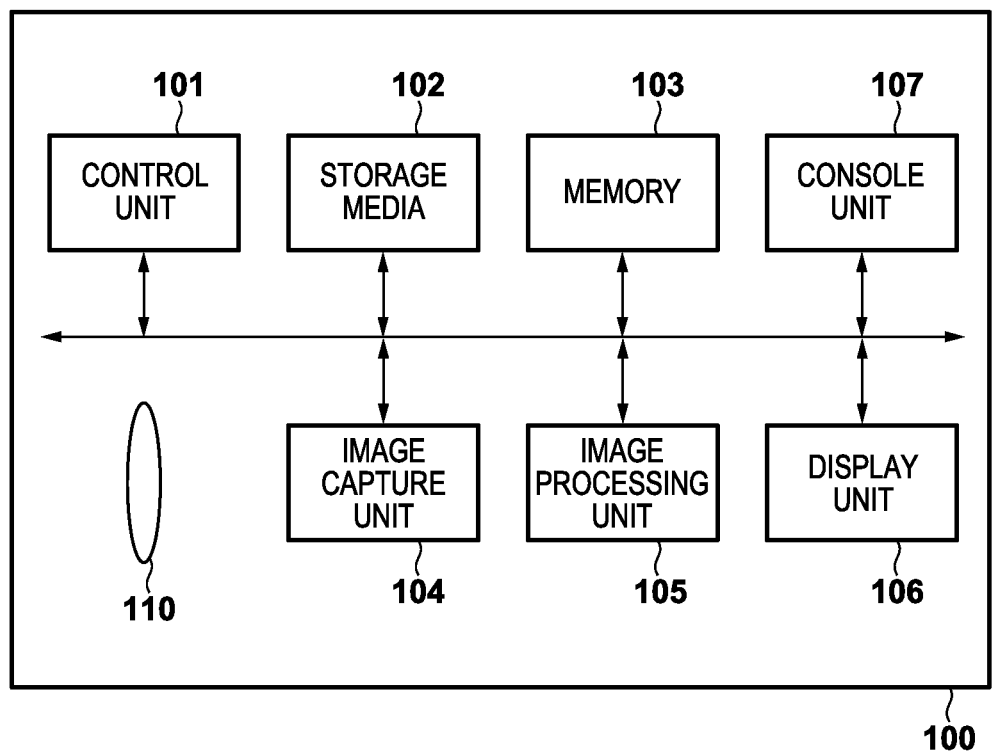
FIG. 1 is a diagram illustrating the functional configuration of a digital camera 100 according to embodiments and variations of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

The embodiment described below is an example of the present invention applied to a digital camera, an example of an image processing apparatus, provided with a display device capable of operating as an electronic viewfinder. However, the present invention can be applied to any device capable of performing tone conversion and generating an image for display. Examples of such a device include a digital camera or digital video camera, a personal computer, a tablet terminal, a mobile phone, a game console, transparent goggles used to present augmented reality (AR) or mixed reality (MR), and the like.

Digital Camera Configuration

FIG. 1 is a block diagram illustrating a functional configuration of a digital camera 100 according to an embodiment of the present invention.

A control unit 101 is a control unit including at least one processor or circuit. The control unit 101 reads out operation programs of each block of the digital camera 100 from a storage medium 102, loads the operation programs in a memory 103, executes the operation programs to execute control of the operations of the digital camera 100.

The storage medium 102 is an electrically erasable and writable non-volatile storage apparatus such as a Flash-ROM. The storage medium 102 stores operation programs of each block of the digital camera 100 as well as constants required for the operations of each block. Also, the storage medium 102 may simultaneously also have a configuration (semiconductor memory card) that stores images (raw data, developed images, and the like) obtained by image capture. The memory 103 is a volatile storage apparatus such as a RAM and DRAM, for example, and is used as the loading area for the operation programs of each block. Also, the memory 103 is used as VRAM when an image is displayed on a display device 106 described below.

A lens 110 is a unit installed with an image capturing lens and is configured to be detachable from the digital camera 100. The lens 110 typically includes a plurality of lenses, however this is simplified in FIG. 1 and only one lens is illustrated. The lens 110 includes a unshown control circuit and controls the state thereof on the basis of a drive signal from the control unit 101.

An image capture unit 104 is an image sensor, such as a CCD or CMOS sensor, for example, and obtains an analog image signal by converting an optical image formed on an imaging surface by the lens 110 into an electrical signal. The obtained analog image signal is converted into a digital image signal (hereinafter, referred to as raw data) by a unshown A/D converter. In the present embodiment described herein, the image capture unit 104 is a single-plate color image sensor provided with a typical primary color filter. In this example, the primary color filter includes three types of color filters with main transmission wavelengths near 650 nm, 550 nm, and 450 nm arranged in a mosaic pattern (Bayer array). By using a primary color filter, each pixel of the single-plate color image sensor captures a color plane corresponding to one of the R (red), G (green), or B (blue) bands. In other words, photoelectric conversion elements that constitute the single-plate color image sensor can only obtain a light intensity for each single color plane. Also, the image capture unit 104 may include a peripheral circuit such as an amplifier circuit that processes a signal obtained from a pixel.

An image processing unit 105 executes various types of image processing, such as pixel interpolation, resizing, color conversion, and the like, on the raw data or the raw data read out from the storage medium 102. The details will be described below. Also, the image processing unit 105 derives information required for exposure control and distance measuring control by executing calculation processing on the raw data obtained via image capture. In the digital camera 100 of the present embodiment, through-the-lens (TTL) type auto focus (AF) processing, auto exposure (AE) processing, pre-flash emission (EF) processing and the like are executed. Also, the image processing unit 105 executes auto white balance (AWB) of the TTL method by performing calculation on the image data obtained via image capture.

The display device 106 is a display apparatus such as a liquid crystal display or the like and displays information such as setting values of the digital camera 100, GUIs such as a message or a menu screen, captured images, or the like. The display device 106 may be an electronic viewfinder (EVF) or rear liquid crystal display built-in the digital camera 100 or an external display detachably connected to the digital camera 100. The control of the display of an electronic viewfinder in the time period when the digital camera 100 is capturing an image is described below using the electronic viewfinder as an example of the display device 106. However, the present invention is not limited thereto.

Also, the display device 106 includes a unshown display control circuit and is configured to be able to change the maximum display luminance. The maximum display luminance of the display device 106 may be dynamically controlled according to a BV value obtained by measuring the light of the captured scene, for example, or the scene brightness may be estimated and set according to the selected image capture mode. Here, the light of the captured scene may be measured on the basis of an image signal obtained by the image capture unit 104 or on the basis of an output of a photometry sensor separately provided, for example. In the present embodiment, information indicating which one is the maximum display luminance of the display device 106 may be able to be obtained, and the information is supplied at least to the image processing unit 105.

A operation unit 107 is a user interface provided in the digital camera 100 of the present embodiment that receives the input of various operations. When the operation unit 107 detects that an operation has been input to the user interface, the operation unit 107 outputs the corresponding control signal to the control unit 101. The operation unit 107 includes a release switch for instructing the start of an image capture preparation operation and the start of image capture (actual image capture), an image capture mode selection switch for selecting the image capture mode, a directional key, an enter key, and the like.

In the present embodiment described herein, the processing relating to the invention is implemented by a circuit or a processor, as hardware, corresponding to the blocks of the digital camera 100. However, the present invention is not limited thereto, and the processing of the blocks may be implemented by a program that executes processing similar to that of the blocks.

Generation Control for Image for Electronic Viewfinder

Next, generating an image (image for display) to be displayed on the electronic viewfinder performed by the digital camera 100 of the present embodiment will be described in detail. The digital camera 100 of the present embodiment has two types of display modes of the electronic viewfinder when capturing images, a setting priority mode, which is a first mode according to the present invention, and a uniform perception mode, which is a second mode according to the present invention. These display modes change the generation method (development method) for a presented image when the captured image obtained by the image capture unit 104 is sequentially displayed on the display device 106 functioning as the electronic viewfinder, and the image capture modes can be independently switched.

The digital camera 100 of the present embodiment is configured in a manner such that, in at least one of the image capture modes that store a developed image, contrast correction, exposure correction, chroma correction, and the like performed in the development processing can be preset. The setting priority mode is a mode for providing an electronic viewfinder display so that the contents of the image correction applied by the development processing can be checked before actual image capture, and this mode is suitable for capturing images while seeing the image to be stored. The uniform perception mode is a mode that provides a display with a contrast perception similar to a case where the user looks directly at the subject with their eyes or a case where the user looks at the subject through an optical viewfinder (OVF) through a lens. The details are described below, however, the uniform perception mode of the present embodiment allows for a display of perceptually uniform tonal expression to be obtained independent of the maximum display luminance of the display device.

The generation of an image for display by the image processing unit 105 includes at least tone conversion in which tone values are allocated to the signal intensities indicated in the raw data. Tone conversion is performed on the basis of input/output characteristics indicating the relationship between the signal values of the raw data and the post-development processing tone values. For example, in tone conversion, a signal value of raw data with a 14-bit resolution is converted to an 8-bit tone value after development processing. The setting priority mode and the uniform perception mode have different input/output characteristics referenced in tone conversion, and thus a difference in tonal expression is produced.

Note that in the present embodiment described herein, as the display modes of the electronic viewfinder, the two types of modes, the setting priority mode and the uniform perception mode, can be switched to in any image capture mode. However, the present invention is not limited thereto. For example, a configuration may be used in which only the uniform perception mode can be used in one or more image capture modes.

Also, the maximum display luminance of the display device 106 is controlled to be different in a case where the captured scene is a sunny day and a case where the captured scene is a night scene, taking into account the visibility of the electronic viewfinder. Specifically, 450 nit is used in a case where the captured scene is a bright scene such as in the case of a sunny day, and 50 nit is used in a case where the captured scene is a dark scene such as in the case of a night scene. However, the values of the maximum display luminance for each scene are not limited thereto, and the maximum display luminances may be set to other values.

Setting Priority Mode

First, generating an image for display in setting priority mode will be described.

Figure 2:
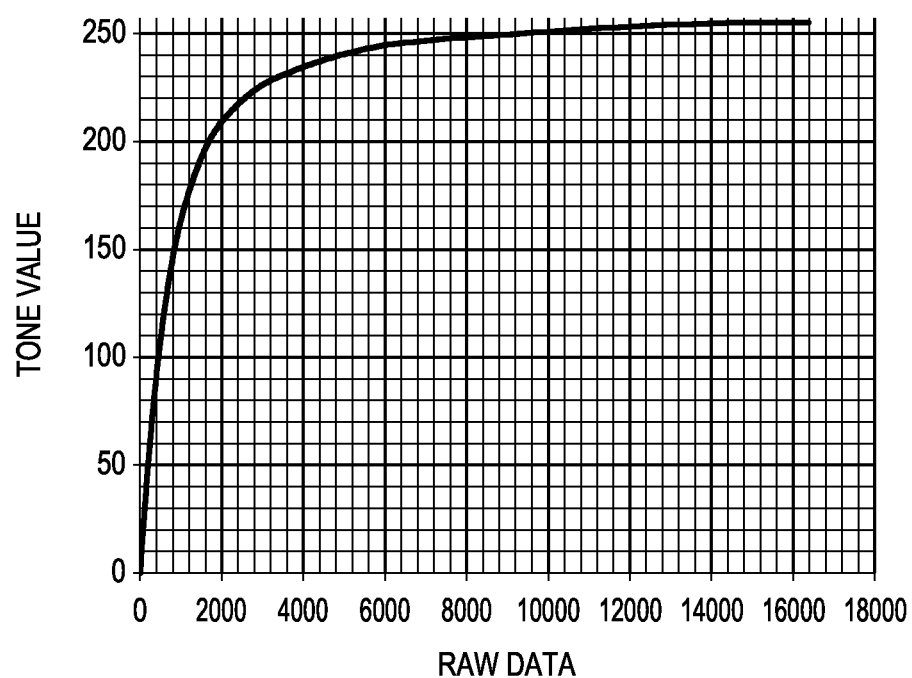
FIG. 2 is a diagram illustrating an input/output characteristic of a setting priority mode according to embodiments and variations of the present invention.

With the image processing unit 105 of the present embodiment, in tone conversion according to the setting priority mode, as illustrated in FIG. 2 for example, a common input/output characteristic is used independent for the brightness of the captured scene. In the example illustrated in FIG. 2, tone values for an 8-bit image for display (developed image) are allocated to the signal values of 14-bit raw data as described above.

Figure 3A:
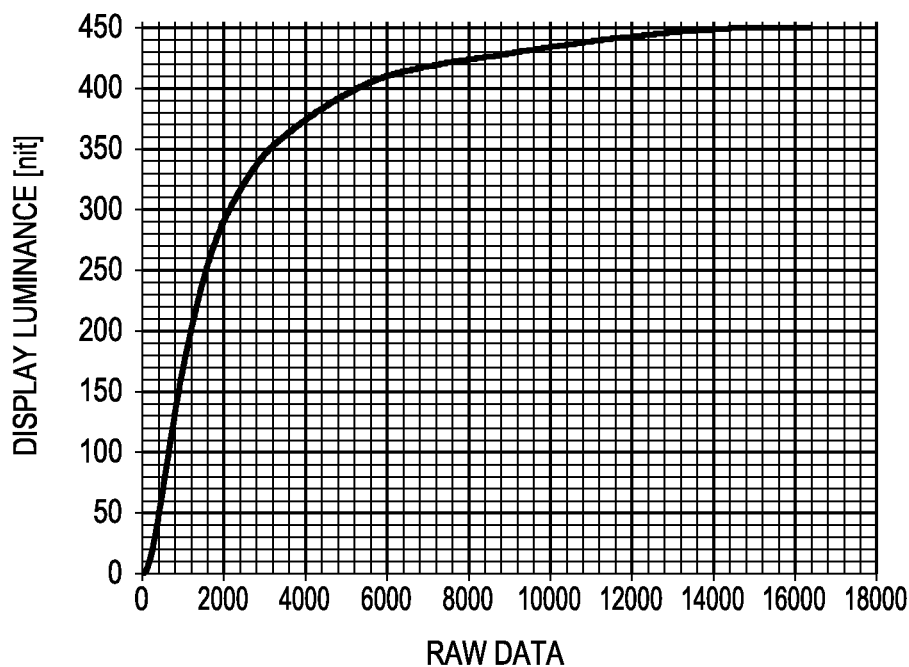
FIGS. 3A and 3B are diagrams illustrating the relationship between an input and a display luminance in a setting priority mode according to embodiments and variations of the present invention.
Figure 3B:
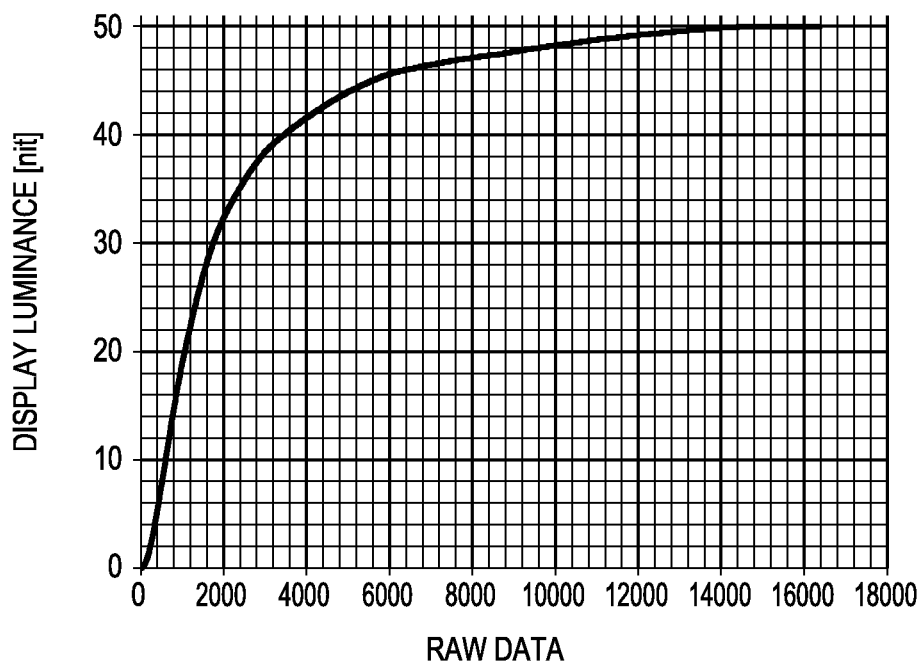

The display device 106 has a unique display characteristic (in the present embodiment, γ2.2 for example) and is configured to perform control to switch the maximum display luminance depending on the brightness of the captured scene. Thus, in a case where the image for display is displayed on the display device 106, the relationship between the signal value of the raw data and the display luminance of the display device 106 is as illustrated in FIGS. 3A and 3B. The relationship in a case where the captured scene is a sunny day is illustrated in FIG. 3A, and the relationship in a case where the captured scene is a night scene is illustrated in FIG. 3B. As illustrated in the graphs of FIGS. 3A and 3B, the vertical axis represents the display luminance (nit) of the display device 106, and the luminance range in which the signal values of the raw data are allocated is different depending on whether it is a sunny day or a night scene. In other words, the maximum display luminance of the display device 106 is preferably made different depending on the brightness of the captured scene, and this makes the range of the display luminance that represents tonal expression different.

Here, the difference in human visual perception that manifests in the sunny day scene and the night scene with a different maximum display luminance in the setting priority mode will be described with reference to the diagrams.

According to the Weber-Fechner law, the intensity of sensation perceived by a human is proportional to the logarithm of the stimulus intensity given to the sensory receptor. In the present specification, on the basis of this relationship between the intensity of sensation and the stimulus intensity, the input/output characteristics are compared by evaluating the relationship of the input and output when converting from a raw data signal value to a final display luminance in terms of human perception. In other words, with the signal value corresponding to the amount of light indicated in the raw data corresponding to the stimulus intensity and the final display luminance obtained in consideration of the maximum display luminance of the display device 106 as the intensity of sensation, this relationship is evaluated, and the difference in the perceptual contrast via the electronic viewfinder is described. Note that the input/output characteristic described here is different from a tone characteristic relating to conversion from a raw data signal value to a developed image tone value as illustrated in FIG. 2 and is a tone characteristic relating to conversion from a raw data signal value to an absolute luminance when displaying on a discretionary display device. Hereinafter, to differentiate between the two, the tone characteristic relating to conversion from a raw data signal value to an absolute luminance is referred to as an absolute input/output characteristic.

Hereinafter, when discussing the absolute input/output characteristic relationship between a raw data signal value and an absolute luminance, a logarithmic value of the signal value will be used for the former and a luminance component value of a uniform perceptual color space based on human visual characteristics will be used. In the present embodiment, as the luminance component value of the uniform perceptual color space, an I value of ICtCp color space specified in ITU-R BT.2100 will be used. An I value can be derived from an RGB value using an inverse characteristic of an EOTF (inverse EOTF) of the perceptual quantization (PQ) method standardized in SMPTE ST 2084. The PQ method determines an absolute luminance that is independent of the display characteristic unique to the display device and is suitably used to define the intensity of sensation because bits are efficiently allocated on the basis of human visual characteristics.

Figure 4A:
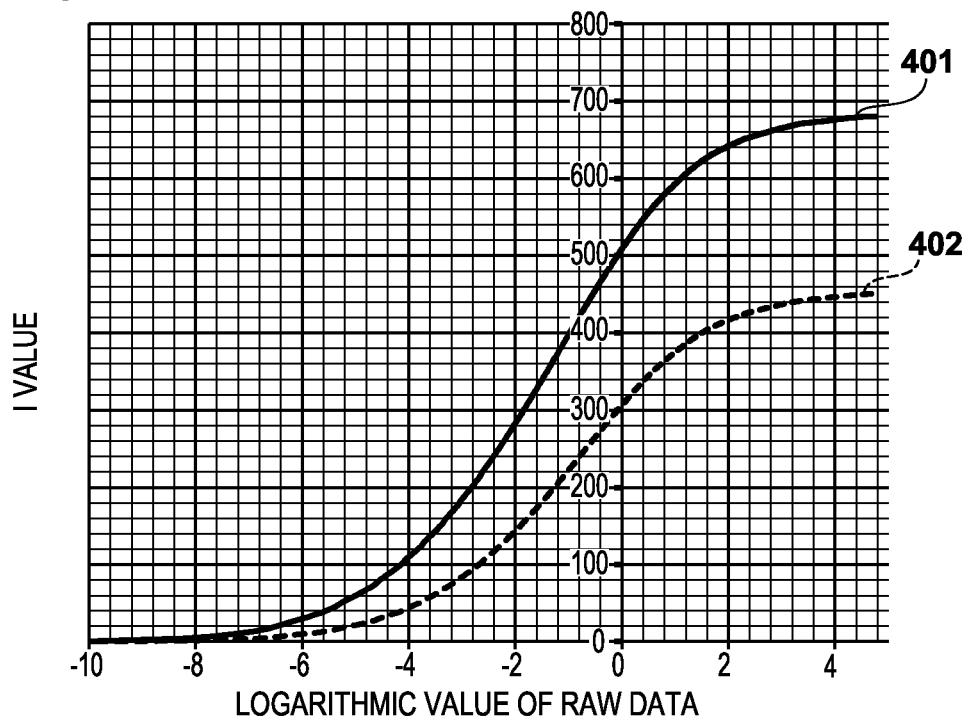
FIGS. 4A and 4B are diagrams illustrating an absolute input/output characteristic of a setting priority mode according to embodiments and variations of the present invention.

Using this, the absolute input/output characteristics of the two types of captured scenes in the setting priority mode correspond to the relationship illustrated in FIG. 4A. In the diagram, the horizontal axis represents the logarithmic value of the raw data signal value (hereinafter, referred to simply as the logarithmic value of the raw data), with the appropriate exposure values being normalized (indicated by stages with the appropriate exposure logarithmic value set to stage 0). The vertical axis represents the I value. In the example of FIG. 4A, a curved line (solid line) 401 indicates the absolute input/output characteristic from a sunny day, and a curved line (dashed line) 402 indicates an absolute input/output characteristic from a night scene. As can be seen in the diagram, due to the difference in the maximum display luminance between when it is a sunny day and when it is a night scene, the allocated value ranges (luminance ranges) of the I value with respect to the raw data logarithmic value are different.

Herein, if the input/output, i.e., the raw data logarithmic value has a linear relationship with the I value, according to the Weber-Fechner law, this can be said to represent a perceivably uniform contrast matching human perceptual characteristics. In the example of FIG. 4A, the absolute input/output characteristic from a sunny day and the absolute input/output characteristic when a night scene are both represented by a linear relationship in the value range (stage range) in and near the appropriate exposure. Hereinafter, as illustrated in FIG. 4A, this graph with the raw data logarithmic value on the horizontal axis and the I value on the vertical axis is referred to as a perception linear graph.

However, according to the Weber-Fechner law, an increment (magnification) of the stimulus intensity is proportional to an increment of the intensity of sensation. Thus, if the increments of the raw data logarithmic value are uniform, regardless of the reference logarithmic value, the increments of the I value do not change. In other words, if it is perceptually uniform, the difference (I value increment) in the brightness when the raw data logarithmic value is increased a discretionary multiple from the reference value should be perceived roughly the same independent of the reference value. In other words, if have the same (visual) perception via a sensory receptor, regardless of the maximum display luminance of the display device 106, the perception linear graph needs to show the same inclination, i.e., the same proportional constant (stimulus constant).

Figure 4B:
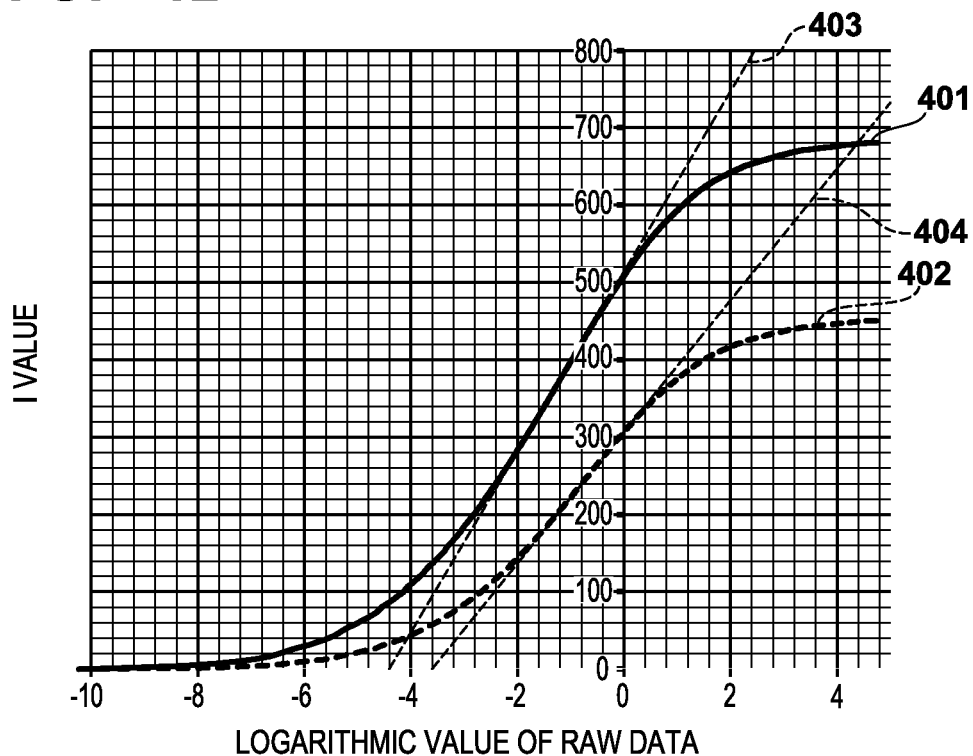

However, the two absolute input/output characteristics indicated in the perception linear graph of FIG. 4A are different in terms of the inclination in the section of linear relationship as indicated by a straight line (dash-dot-dash line) 403 and a straight line (dash-dot-dot-dash line) 404 in FIG. 4B. This means that in the setting priority mode, absolute input/output characteristics for perceiving different contrasts are used for the two captured scenes with different maximum display luminances for the display device 106. In other words, the difference in brightness perceived in the electronic viewfinder is different depending on whether it is day or night, meaning that it is not uniform.

The difference in the inclination in the perception linear graph represents how, in a case where the captured scene is a night scene, there is an appropriate contrast perception compared to the appearance with the naked eye, and yet in the case of a sunny day, the contrast is higher than in actuality and the dark portions appear to shadow-detail loss. In other words, in how the developed image obtained with the same input/output characteristic as illustrated in FIG. 2 is displayed on the display device 106, the degree of deviation of the contrast perception between a case where the subject is seen with the naked eye and a case where the subject is seen through the electronic viewfinder changes depending on the maximum display luminance of the display device 106. Specifically, in a case where the input/output characteristics is fixed and the maximum display luminance of the display device 106 is changed, as the maximum display luminance is increased, the contrast also increases (the inclination in the perception linear graph becomes steep), leading to a deviation in the contrast perception between the captured scenes.

Uniform Perception Mode

Figure 5:
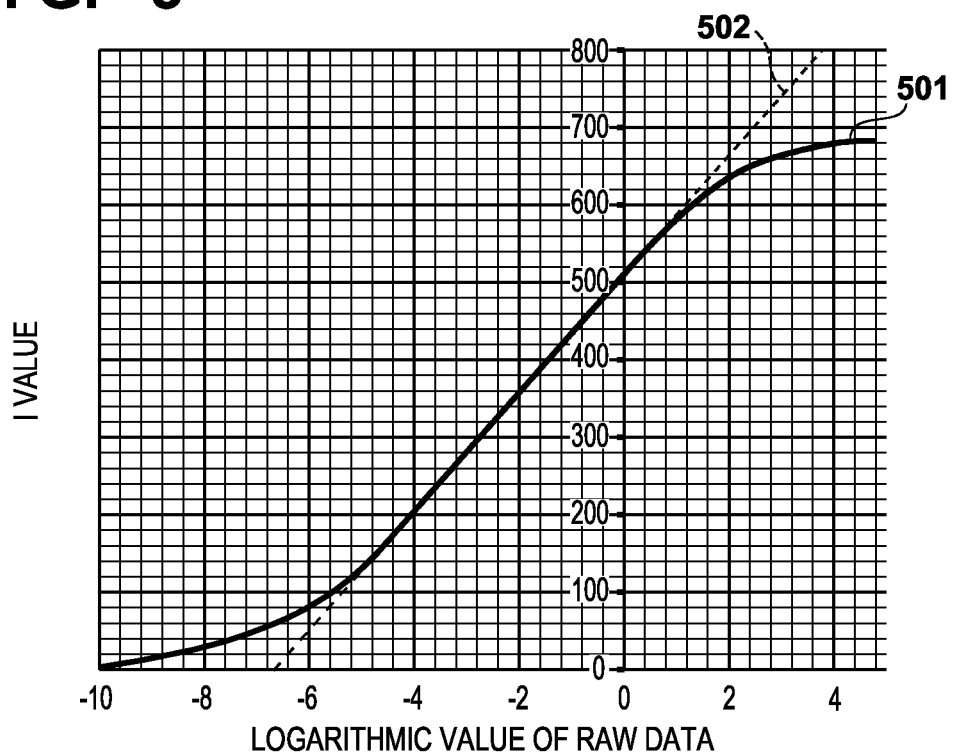
FIG. 5 is a diagram illustrating an absolute input/output characteristic of a uniform perception mode according to a first embodiment of the present invention.
Figure 6:
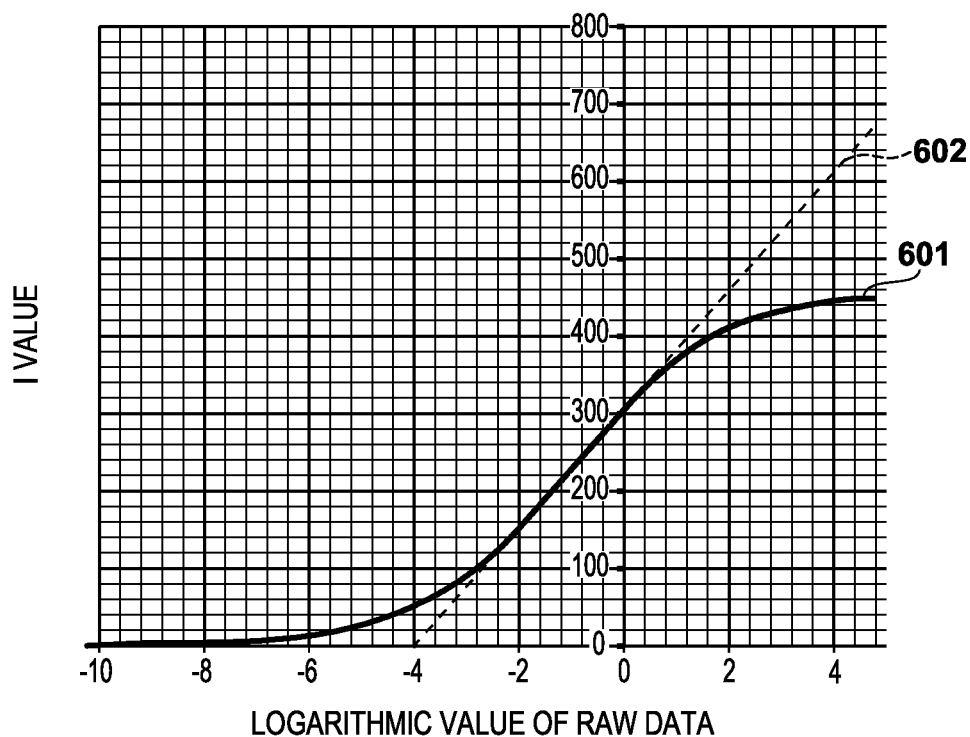
FIG. 6 is another diagram illustrating an absolute input/output characteristic of a uniform perception mode according to a first embodiment of the present invention.

In the uniform perception mode, in the stage range or luminance range in the linear relationship of the perception linear graph, the absolute input/output characteristic is set to show a constant stimulus constant independent of the maximum display luminance of the display device 106. Specifically, in a sunny day captured scene with the maximum display luminance set to 450 nit, the absolute input/output characteristic indicated by curved line 501 in the perception linear graph of FIG. 5 is used. Also, in a night scene captured scene with the maximum display luminance set to 50 nit, the absolute input/output characteristic indicated by curved line 601 in the perception linear graph of FIG. 6 is used.

As illustrated in the diagrams, the two absolute input/output characteristics match dashed lines 502 or 602 indicating a common inclination (stimulus constant) in at least a portion of the stage range or the luminance range, and in the dark portion and the saturated portion show a gently plateauing inclination. In the present embodiment, the inclination of the dashed lines 502 and 602 is set to 75. Also, so that the difference in the brightness atmosphere between the setting priority mode for the same captured scene is decreased, for the two absolute input/output characteristics, the I value at appropriate exposure is set to the same value as in the setting priority mode.

Herein, the value of 75 for the inclination in the range represented (matching the dashed line) by the linear relationship is a temporary optimal value derived from experimentation such that the difference in brightness between when the subject is seen with the naked eye and when the subject is seen through the electronic viewfinder is decreased and the contrast perception is made uniform. Also, in the present embodiment, the I intercept of the curved line 501, the dashed line 502, the curved line 601, and the dashed line 602 are each set to the same value as the I value of appropriate exposure with the maximum display luminance in the setting priority mode. Accordingly, the display luminance at appropriate exposure can be set to a suitable value as in the setting priority mode, and, for any captured scene, the difference from the raw data signal value at appropriate exposure can be represented by a uniform display luminance difference.

Thus, in the uniform perception mode, by using the tone characteristic of the absolute input/output characteristic indicating a uniform inclination in the perception linear graph, independent of the maximum display luminance of the display device 106, an electronic viewfinder with a perceivably uniform contrast can be provided. In other words, the difference in brightness in at least the range represented by the linear relationship is constant, independent of the captured scene or the maximum display luminance of the display device 106, and thus a uniform contrast can be perceived.

Functional Configuration of Image Processing Unit 105

The functional configuration of the image processing unit 105 relating to generating an image for display in each display mode will be described below with reference to the diagrams. In the present embodiment, to determine the difference between the setting priority mode and the uniform perception mode in the development processing executing in relation to generating an image for display, the functional configuration will be described referencing diagrams divided by mode. However, these do not need to be implemented as different hardware. In other words, an image for display for the two display modes can be generated by at least a portion of the functional configuration being controlled to be used or not or the operations being changed depending on switching the display mode. The functional configuration is described with the different blocks corresponding to the items of processing executed by the image processing unit 105 in the development processing.

Setting Priority Mode

Figure 7:
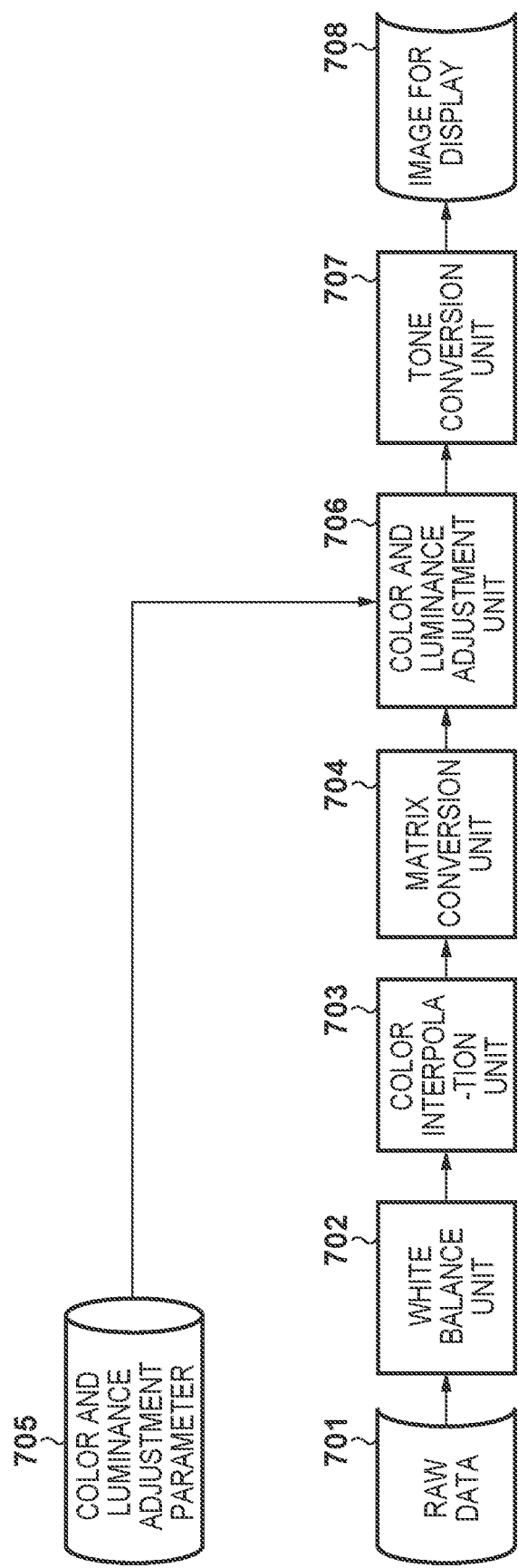
FIG. 7 is a diagram illustrating the functional configuration of an image processing unit 105 according to the setting priority mode of embodiments and variations of the present invention.

The development processing relating an image for display in the setting priority mode is implemented by the functional configuration illustrated in FIG. 7. As described above, a primary color filter in which three types of color filters are arranged in a mosaic pattern is used in the image capture unit 104. Accordingly, raw data 701 is a color mosaic image. The image processing unit 105 reads out the raw data 701 from the memory 103, applies development processing relating to the setting priority mode, and generates an image for display 708.

A white balance unit 702 executes white balance processing on the raw data 701 to color convert the image of the subject, originally white, to white. Specifically, the white balance unit 702 plots the RGB data of each pixel constituting the raw data 701 in a predetermined color space such as an xy color space, for example. Then, the white balance unit 702 performs integration of the R, G, B of the data plotted at or near the locus of black body radiation with a high likelihood of being a light source color in the color space and derives the white balance coefficient (G/R and G/B) of the R and B component from the integration value. The white balance unit 702 executes white balance processing using the obtained white balance coefficient, and tinting caused by the light source can be corrected and white reproduced.

A color interpolation unit 703, on the image data obtained via conversion by the white balance unit 702, executes noise reduction processing and processing to interpolate the pixel values of the color components not included in the pixels. Via this processing, a synchronized image with a complete set of color information (pixel values of color components) of R, G, and B for all of the pixels is generated.

The synchronized image generated by the color interpolation unit 703 is converted to a color image, the basis of the processing, via matrix conversion processing executed by a matrix conversion unit 704. Furthermore, adjustment processing to adjust the color and luminance is executed on the color image by a color and luminance adjustment unit 706, and the image for display 708 is generated via tone conversion (gamma conversion) processing relating to the input/output characteristic of FIG. 2 executed by a tone conversion unit 707.

Here, adjustment by the color and luminance adjustment unit 706 includes adjustments performed referencing a color and luminance adjustment parameter 705 describing settings for contrast correction, exposure correction, color saturation correction, and the like to be applied to the stored image. Also, the tone conversion unit 707 executes tone conversion processing using the input/output characteristic illustrated in FIG. 2 uniformly independent of the captured scene.

By displaying the image for display 708 generated in this manner on the display device 106 with a maximum display luminance controlled in accordance with the captured scene, an electronic viewfinder relating to the setting priority mode is implemented. In other words, regarding the raw data 701 and the displayed image for display 708, the relationship of the absolute input/output characteristic illustrated in the perception linear graph of FIG. 4 is satisfied.

Uniform Perception Mode

Figure 8:
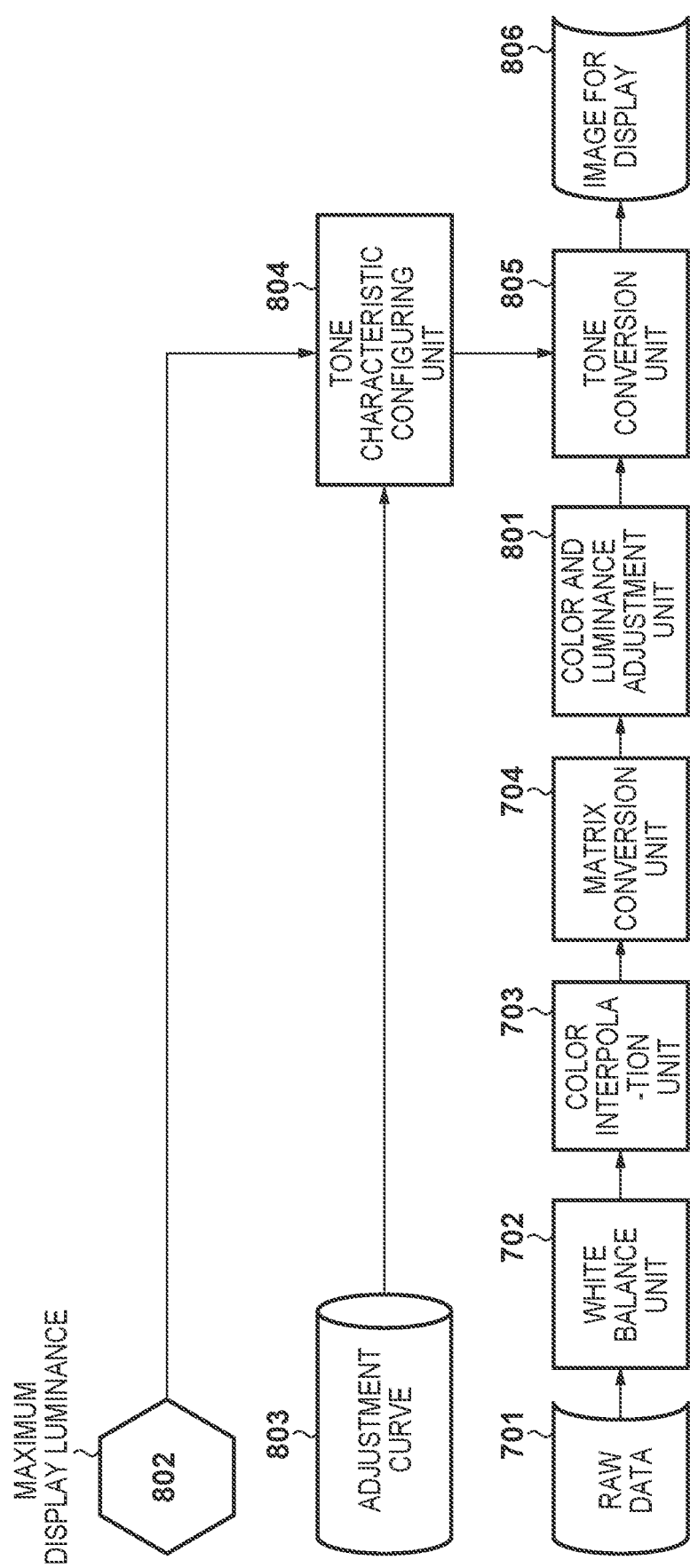
FIG. 8 is a diagram illustrating the functional configuration of an image processing unit 105 according to the uniform perception mode of an embodiment and a variation of the present invention.

The development processing relating an image for display in the uniform perception mode is implemented by the functional configuration illustrated in FIG. 8. The functional configurations for performing operations similar to that of in the setting priority mode will be given the same reference number, and only the functional configurations for performing different operations will be described below with reference to FIG. 8.

In the uniform perception mode, the color and luminance adjustment unit 801 performs on a color image obtained by the matrix conversion unit 704 does not include adjustment in accordance with settings for storing. Also, an image for display 806 is generated by a tone conversion unit 805 applying tone conversion processing to an image after adjustment by the color and luminance adjustment unit 801.

In the tone conversion processing executed by the tone conversion unit 805, a tone characteristic configured by a tone characteristic configuring unit 804 is used. The tone characteristic configuring unit 804, when configuring the tone characteristic, obtains a maximum display luminance 802 of the display device 106 and an adjustment curve 803 (either of the curved lines in FIGS. 5 and 6) of the absolute input/output characteristic corresponding to the maximum display luminance 802. Here, the adjustment curve 803 indicates the relationship between the raw data 701 logarithmic value and the I value, i.e., the absolute luminance.

Thus, the tone characteristic configuring unit 804 of the present embodiment performs conversion to make the display luminance correspond to the absolute luminance for the display device 106. In other words, by multiplying the absolute input/output characteristic indicated by the adjustment curve 803 by the inverse characteristic of the display characteristic, the tone characteristic used in tone conversion of the tone conversion unit 805 is configured. Using the tone characteristic configured in this manner, the tone conversion unit 805 executes tone conversion processing of an image on which color and luminance adjustment has been performed.

By displaying the image for display 806 generated in this manner on the display device 106 with a maximum display luminance controlled in accordance with the captured scene, an electronic viewfinder relating to the uniform perception mode is implemented. In other words, regarding the raw data 701 and the displayed image for display 806, the relationship of the absolute input/output characteristic illustrated in the perception linear graph of FIG. 5 or 6 is satisfied, and a perceivably uniform contrast independent of the maximum display luminance can be achieved.

First Variation

Note that in the uniform perception mode of the embodiment described above, to ensure the absolute luminance indicated by the adjustment curve 803, the inverse characteristic of the display characteristic of the display device 106 is used in multiplication. However, the present invention is not limited thereto. As described above, because the I value is based on the PQ method that determines the absolute luminance independent of the display characteristic unique to the display device, as long as a display device capable of displaying an image developed via the PQ method is used, there is no need to use the inverse characteristic of the display characteristic in multiplication when configuring the tone characteristic from the adjustment curve 803. The present invention can be implemented as long as the display device capable of changing the maximum display luminance can generate an image with a uniformly perceivable contrast independent of change in the maximum display luminance. Here, the information of the set maximum display luminance may be able to be obtained from the display device via a signal defined by a standard used for connecting to the display device or may be able to be obtained from another device that controls the operations of the display device. In other words, the result of measuring the light of the captured scene is not required to be used in the determination as in the first embodiment.

Second Variation

With the absolute input/output characteristic of the uniform perception mode indicated in FIGS. 5 and 6 of the embodiment described above, the inclination of the dashed lines 502 and 602 is set to 75. However, the present invention is not limited thereto. Even with an inclination of from 65 to 85, for example, there is a contrast perception when seeing the subject with the naked eye. Thus, regarding the two absolute input/output characteristics, a stimulus constant relating to the stage range or the luminance range in which there is a linear relationship does not need to be strictly the same, and it is only required that the value is set to roughly the same value included in the range (from 65 to 85) described above.

Third Variation

With the absolute input/output characteristic of the uniform perception mode indicated in FIGS. 5 and 6, because the maximum display luminance of the display device 106 is different depending on whether it is a sunny day scene or a night scene, the stage range or the luminance range where there is a linear relationship is different. In the example in the diagrams, there is a linear relationship in the stage range or luminance range, including the appropriate exposure, of from approximately −5 stages to approximately +2 stages for when it is a sunny day and from approximately −3 stages to approximately +1 stage for when it is a night scene. This difference is due to the luminance range able to be allocated to raw data signal values expanding in accordance with the maximum display luminance of the display device 106.

However, the present invention is not limited thereto, and the stage range or the luminance range in which there is a linear relationship may be able to be changed to match the luminance range in which the subject is easily seen, such as high luminance when it is a night scene and low luminance when it is a sunny day scene. Also, the breadth (width) of the stage range or the luminance range in which there is a linear relationship is better to be larger from the perspective of giving the user the impression of it being perceptually uniform. However, the present invention is not necessarily limited to that illustrated in FIGS. 5 and 6. The presentation of a perceivably uniform contrast independent of the maximum display luminance of the display device 106 may be able to be changed to appear in a specific stage range or luminance range.

Fourth Variation

Also, in the examples of FIGS. 5 and 6, the I intercept of each absolute input/output characteristic is set to be equivalent to the I value at appropriate exposure in the setting priority mode. However, the present invention is not limited thereto. For example, when the captured scene is a night scene, because a contrast perception close to that of the naked eye can be achieved and the visibility of dark portions can be improved in a compatible manner, the I intercept may be set to a higher value. Also, for example, when the captured scene is a night scene, in order to make the brightness closer to that of looking at the subject with the naked eye, the I intercept may be set to a lower value. Also, as long as the inclinations relating to the absolute input/output characteristics can be ensured to be roughly the same independent of the maximum display luminance, the I intercept can be able to be changed to a discretionary value in not just the case where the captured scene is a night scene. The I intercept may be changed depending on the user settings, the scene recognition result, and the like.

Fifth Variation

In the embodiment described above, there are two stages in the settings of the maximum display luminance of the display device 106 and two types of absolute input/output characteristics for the uniform perception mode. However, it should be easily understood that the present invention is not limited thereto. In other words, it is only required that included in the tone characteristic used to generate an image for display is a stage range or a luminance range indicating a roughly identical proportional constant linear relationship independent of the maximum display luminance between the logarithmic value of the image signal, i.e., the input, and the absolute luminance when displaying the developed image of the image signal. Accordingly, the number of such a tone characteristic provided is the same as the number of maximum display luminances the display device 106 is able to be set to, and it is only required that the proportional constant in the section where there is a linear relationship is roughly identical in this range.

Second Embodiment

With a configuration in which the correction settings applied to the stored image is able to be checked in the electronic viewfinder as in the setting priority mode, depending on the contents of the correction setting and the maximum display luminance of the display device 106, an image for display that causes burn-in on the display device 106 may be output. For example, with a captured scene with a wide dynamic range such as a sunny day scene, to improve visibility, it is desireble to increase the maximum display luminance of the display device 106 to expand the dynamic range of the electronic viewfinder. However, depending on the correction settings applied to the stored image, the entire image for display may be saturated, with display over an extended period possibly causing damage to the display device 106. Also, displaying such an image at an increased maximum display luminance leads to increased power consumption. Thus, there needs to be restrictions on the maximum display luminance able to be set for the display device 106 in the setting priority mode.

However, in the uniform perception mode, because adjustment in accordance with the correction setting applied to the stored image is not performed and the absolute luminance for the display device 106 is set by the absolute input/output characteristic, compared to the setting priority mode, there is less likelihood of the display device 106 being damaged. Thus, the maximum display luminance of the display device 106 set in accordance with the photometry result may be set to a higher value in the uniform perception mode than in the setting priority mode.

Figure 9:
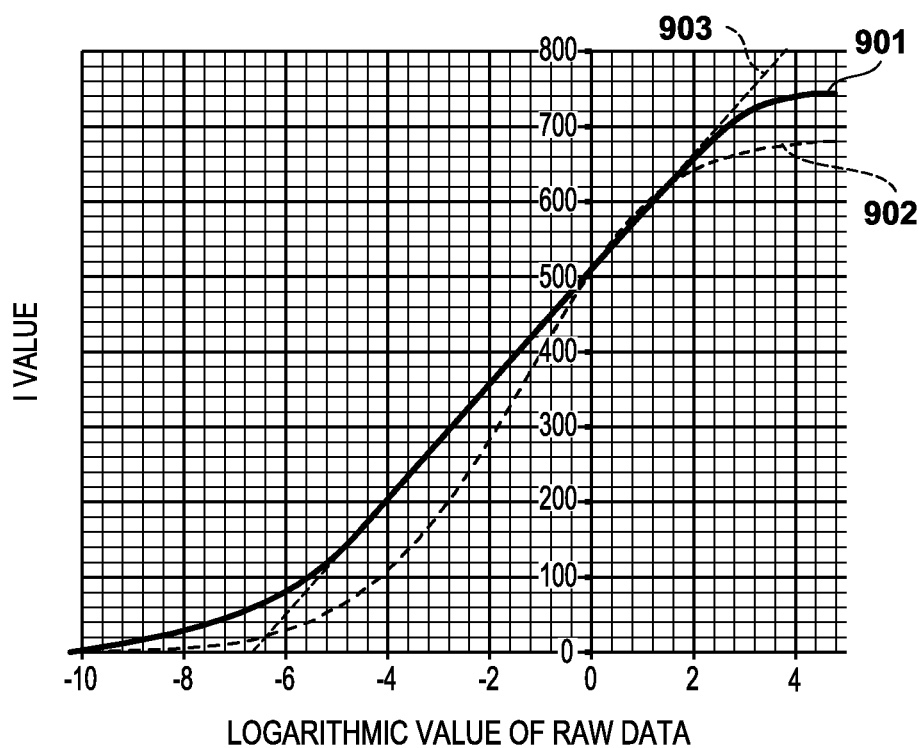
FIG. 9 is a diagram illustrating an absolute input/output characteristic of a uniform perception mode according to a second embodiment of the present invention.

For example, in a case where the captured scene is a sunny day, the maximum display luminance in the setting priority mode may be set to 450 nit, and the maximum display luminance in the uniform perception mode may be set to a higher 800 nit, even with the tone conversion performed to stay in an I value of 700 as illustrated in FIGS. 4A and 4B. Here, corresponding with the increase in the maximum display luminance, the dynamic range of the electronic viewfinder is expanded, and the absolute input/output characteristic relating to the uniform perception mode can increase the maximum value of the I value as indicated by solid line 901 in FIG. 9, for example. A dashed line 902 indicates the absolute input/output characteristic of the setting priority mode relating to a sunny day, and it should be understood that the absolute input/output characteristic of the uniform perception mode is mapped to a higher I value in a higher stage range. Accordingly, as illustrated in the diagram, the luminance range (luminance range matching a dot-dash line 903 with a constant inclination) indicating a linear relationship can be expanded, the visibility can be increased, and an image for display with a perceivably uniform contrast in a wide range can be generated.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-035635, filed Mar. 5, 2021, which is hereby incorporated by reference wherein in its entirety.

What is claimed is:

1. An image processing apparatus for generating an image to display on a display unit configured so that a setting for maximum display luminance can be changed, comprising at least one processor and/or circuit configured to perform operations of the following units:
    a first obtaining unit configured to obtain an image signal;
    a second obtaining unit configured to obtain the setting for the maximum display luminance of the display unit;
    a generating unit configured to generate the image to display by executing image processing including tone conversion on the image signal obtained by the first obtaining unit; and
    a setting unit configured to set a tone characteristic used in tone conversion executed by the generating unit based on the setting for the maximum display luminance obtained by the second obtaining unit, wherein
    the tone characteristic is for allocating a signal value of the image signal to a luminance range according to the setting for the maximum display luminance; and
    the tone characteristic shows a relationship where a logarithmic value of the signal value of the image signal and an absolute luminance are in a roughly identical proportional constant linear relationship in at least a portion of the luminance range, independent of the setting for the maximum display luminance,
    wherein a breadth of the at least a portion of the luminance range is different depending on the setting for the maximum display luminance.

2. The image processing apparatus according to claim 1, wherein
    the setting unit changes the breadth of the at least a portion of the luminance range.

3. The image processing apparatus according to claim 1, wherein
    the setting unit changes a range of the absolute luminance included in the at least a portion of the luminance range.

4. The image processing apparatus according to claim 1, wherein
    the setting unit changes the absolute luminance with respect to a predetermined logarithmic value.

5. The image processing apparatus according to claim 1, wherein the absolute luminance is a luminance component of a uniform perceptual color space.

6. The image processing apparatus according to claim 1, wherein the absolute luminance is an I value in an ICtCp color space.

7. The image processing apparatus according to claim 6, wherein
the roughly identical proportional constant is from 65 to 85.

8. An image capture apparatus, comprising:
the image processing apparatus according to claim 1;
image capture unit configured to capture an image of a captured scene and outputting the image signal;
the display unit; and
at least one processor and/or circuit configured to perform operations of a changing unit configured to change the setting for the maximum display luminance of the display unit.

9. The image capture apparatus according to claim 8, wherein
the changing unit changes the setting for the maximum display luminance according to a brightness of the captured scene.

10. The image capture apparatus according to claim 8, wherein the at least one processor and/or circuit further configured to perform operations of the following units:
a developing unit configured to develop the image signal and generate a stored image; and
a storing unit configured to store the stored image generated by the developing unit, wherein
a display mode of the display unit includes a first mode for displaying an image generated by applying correction relating to the stored image to the image signal and a second mode for displaying the image to display generated by the generating unit; and
the absolute luminance with respect to a predetermined logarithmic value is equivalent in the first mode and the second mode for an identical captured scene.

11. The image capture apparatus according to claim 10, wherein
the changing unit sets the maximum display luminance higher in the second mode than in the first mode for an identical captured scene.

12. The image capture apparatus according to claim 8, wherein
the display unit is an electronic viewfinder.

13. A computer-readable storage medium storing a program for causing a computer to perform operations of the units of the image processing apparatus according to claim 1.

14. A control method for an image processing apparatus for generating an image to display on a display unit configured so that a setting for maximum display luminance can be changed, comprising:
obtaining an image signal;
obtaining the setting for the maximum display luminance of the display unit;
generating the image to display by executing image processing including tone conversion on the obtained image signal; and
setting a tone characteristic used in tone conversion executed in the generating on the basis of the setting for the obtained maximum display luminance, wherein
the tone characteristic is for allocating a signal value of the image signal to a luminance range according to the setting for the maximum display luminance; and
the tone characteristic shows a relationship where a logarithmic value of the signal value of the image signal and an absolute luminance are in a roughly identical proportional constant linear relationship in at least a portion of the luminance range, independent of the setting for the maximum display luminance,
wherein a breadth of the at least a portion of the luminance range is different depending on the setting for the maximum display luminance.

* * * * *